July 19, 1938.  J. E. ALBRIGHT ET AL  2,124,023
TUNING INDICATOR AND DIAL
Filed March 28, 1936   2 Sheets-Sheet 1
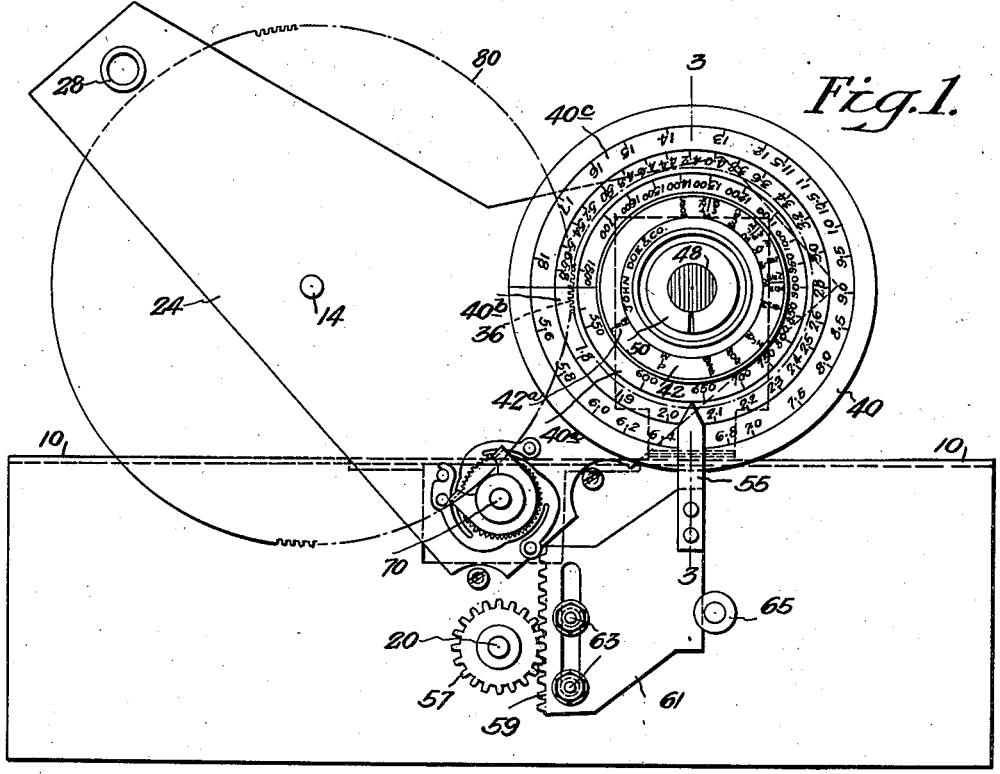
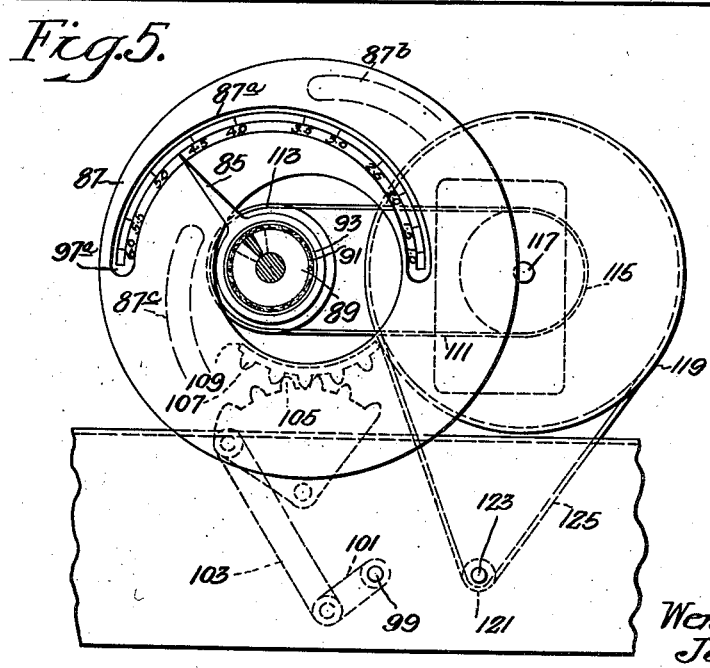
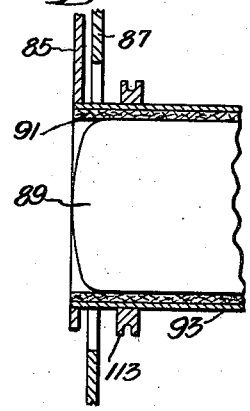
Inventors
Wendell L. Carlson
James E. Albright
by J. Huff
Attorney.

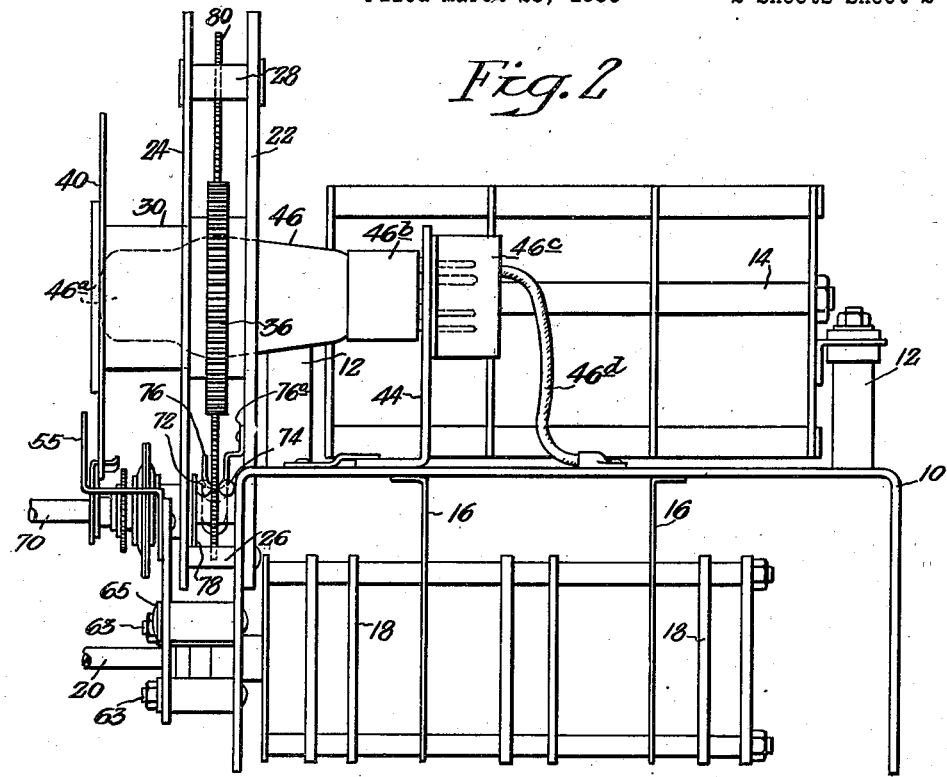

Patented July 19, 1938

2,124,023

UNITED STATES PATENT OFFICE 2,124,023

TUNING INDICATOR AND DIAL

James E. Albright, Collingswood, and Wendell L. Carlson, Haddonfield, N. J., assignors to Radio Corporation of America, a corporation of Delaware Application March 28, 1936, Serial No. 71,384

8 Claims. (Cl. 250—40)

This invention relates to indicators and particularly to tuning indicators for radio apparatus and the like.

Modern practice dictates the use of so-called "shadow" or "silent" resonance indicators, in addition to the usual frequency indicating dial, as an aid in adjusting the variable tuning elements to bring in the signals with optimum clarity and tone. While various types of these silent resonance indicators are known perhaps the most satisfactory type is that known in the art as the "magic-eye". In its preferred form the magic-eye is constituted by a minature cathode-ray tube adjacent the top or leading-end of which is a disc-shaped shield which conceals a thermionic cathode. This disc is surrounded by a dish-shaped target or screen coated with a fluorescent material upon which electrons from the cathode impinge to produce a luminous annular shaped pattern on the target. A control electrode is provided between the cathode and target for determining the area of fluorescence. The electrode elements are so connected with the receiving circuit that when the circuit is tuned to resonance with the incoming signal the luminous portion of the target is of predetermined width; preferably the device is so connected that the luminous portion is of maximum area or width, and the dark portion of minimum width, when the circuit is tuned to resonance.

Usually the tube is mounted horizontally with its leading end (i. e. its "top") seated in, or visible through, an orifice provided for the purpose at a point on the panel somewhat removed from the frequency indicating dial. When so arranged the practice has been for the operator to secure an approximate adjustment on the dial and then to divert his attention to the resonance indicator, moving the tuning control knob blindly, with respect to the dial, and relying the while solely upon the resonance indicator to complete the tuning operation. Instances have arisen, particularly where the station indicia are crowded on the dial, and due to failure of the operator to check the tuning indicator with the resonance indicator, when the set was tuned to resonance at a frequency other than that intended.

Neon and glow type resonance indicators wherein the intensity or the length of the light varies with the condition of resonance suffer the same and other disadvantages, that is to say they are ordinarily positioned and arranged remote from the dial area (and hence constitute an added element on the control panel) so that they complicate the mental steps incident to the tuning operation by requiring the operator to remember the visual condition of the lamp while checking the scale reading on the frequency dial.

An object, therefore, of the present invention is to simplify the construction and the operation of radio apparatus employing both tuning and resonance indicators.

Another object of the invention is to provide a unitary resonance and tuning indicator device wherein both indications are observable at a single glance and whereby adjustment of the variable tuning elements is facilitated and tuning errors are substantially obviated.

Another object of the invention is to provide a combined resonance and tuning indicator device employing a cathode-ray tube and a frequency band scale so positioned with respect to each other that resonance at a particular frequency is achieved when the cathode-ray indicia is "in-line" with the tuning indicia.

Another object of the invention is to provide a combined resonance and tuning indicator device including a chart of the more frequently dialed stations, the chart being readily affixed after assembly and having indicia thereon specific to the locality in which the apparatus is to be used.

The above and other objects are achieved in accordance with the invention by the provision of a dial having a central orifice about which the several frequency band scales are marked and through which a resonance indicating device is viewed. The resonance indicator may be a miniature cathode-ray tube in which case it is preferably of the type wherein the non-luminous indication of the resonant condition of the circuits associated therewith is in the pattern of a fan which closes or contracts, as the circuits approach resonance. A main frequency scale pointer is provided adjacent the dial and the resonance indicator tube is preferably so positioned with respect thereto that when resonance is attained the dark portion of the luminous pattern is in line with the pointer and also with the dial indicia specific to the particular frequency to which the receiver is tuned. An auxiliary dial in the form of a detachable shell or "bezel" having local station indicia thereon fits snugly in the main dial aperture for movement with the main dial about the resonance indicator tube.

Certain details of construction, together with other objects and advantages will be apparent and the invention itself will be best understood by reference to the following specification and to the accompanying drawings, wherein:

Fig. 1 is a front elevation, and

Fig. 2 is a side elevation of a radio receiver chassis having a multi-band frequency indicating dial and resonance indicator, designed, positioned, and arranged in accordance with the invention.

Fig. 3 is a cross-sectional view taken on the line 3—3 of Fig. 1 showing the dial insert upon which local station indicia are marked; and the manner of attaching the same.

Fig. 4 is a front elevation of the combined tuning and resonance indicating device of Fig. 1 as viewed through an escutcheon of suitable design.

Fig. 5 is a front elevation of a tuning indicator constructed in accordance with the invention and including a dial and dial moving mechanism of modified construction.

Fig. 6 is a cross-sectional view of the hub containing the resonance indicating tube of Fig. 5 showing the tube fixed for rotation with the hub.

In Figs. 1 and 2, 10 designates the chassis or base of the receiving apparatus. Supported above the base as by posts 12 is a tuning mechanism including a main tuning shaft 14. Secured to the underside of the base as by supports 16 is a wave change device indicated generally by switch plates 18 and a switch actuating shaft 20. Adjacent the front of chassis 10 is a back mounting plate 22 and a front mounting plate 24 both fixed to 10 as by studs 26 and spaced one from the other by spacers 28 to accommodate a mechanism for moving the tuning shaft and dial.

Both plates 22 and 24 have aligned apertures in which a hollow hub 30 is rotatably mounted. As more clearly shown in Fig. 3 this hub 30 projects outwardly from the front mounting plate 24 and has a shoulder 32 on which a frequency indicating dial 40 is fitted. The dial 40 may conveniently be fixed for movement with the hub 30, by heading the rim of shoulder 32, as indicated at 34. Hub 30 also carries an auxiliary dial 42 which, in the embodiment of Figs. 1, 2 and 3, is in the form of a bezel detachably fitted to the circumferential inner wall of hub 30. A toothed gear wheel 36 fixed on hub 30 meshes with teeth on a gear disc 80 fixed on the main tuning shaft 14 so that when shaft 14 is rotated, as in the manner later described, the hub 30 and hence the dials 40—42 are likewise rotated.

The surface of auxiliary dial 42 is appropriately marked with local station indicia 42a (Fig. 4) and, if desired, may carry the advertisement 42b of the local dealer or service agency. Dial 42 is preferably so fixed that the markings 42a thereon are aligned with the appropriate frequency indicia of the broadcast and other frequency scales 40a, 40b, 40c, 40d on the main dial 40.

A bracket 44 on chassis 10 supports a resonance indicator tube 46 adjacent its base 46b. In the embodiment illustrated the long axis of the tube 46 is parallel to the surface of chassis 10 and the body of the tube projects through the hub 30, out of contact therewith, and presents its leading end 46a substantialy flush with the surface of dial 40. The illustrated resonance indicator tube is of the previously described miniature cathode-ray "magic eye" type having a disc-shaped shield 48 which conceals a thermionic cathode 49 and a dish-shaped anode or target 50 coated with a fluorescent material upon which electrons impinge to form a luminous pattern. The electrode elements of the tube 46 are connected through its socket 46c and appropriate lead wires 46d with a receiving circuit (not shown) in a known manner to produce a luminous pattern 50a having a preferably fan shaped dark portion indicated generally by the dotted lines 50b which is of maximum width when the circuit is out of resonance and of minimum area, 50c, when the circuit is in resonance. Appropriate circuit connections are shown, for example, in U. S. P. 2,051,189 to Herbert M. Wagner, issued August 18, 1936.

Tube 46 is so positioned that the axis or "line of symmetry" which bisects the fluorescent area of electrode 50 and about which the non-luminous pattern 50b expands and contracts is aligned with the frequency indicating pointer 55 so that the operator can see at a single glance not only the resonant condition of his apparatus, but also the frequency to which it is tuned. This preferred arrangement of the resonance and frequency indicators substantially obviates the condition, which frequently arises with prior art arrangements, wherein the operator in completing the tuning operation relies solely upon the resonance indicator and as a result may achieve resonance at a frequency of which may be only slightly removed on the dial from that of the frequency which is sought.

Where, as in the above described embodiment, the center of the resonance indicating pattern 50b—50c is fixed with respect to the vertical axis of the frequency indicating pointer 55, the tube 46 is mounted in its bracket 44 within only sufficient play to permit of alignment. Where, as in the later described embodiment of Figs. 5 and 6 the center of the fluorescent pattern on the resonance indicator is fixed with respect to a rotatable pointer, the indicator tube is permitted to rotate, say 180°, with the pointer. In this latter case, the tube nests snugly within the hub so that it rotates therewith; the lead wires being long enough and loose enough to permit of such movement.

As shown in Figs. 1 and 2 the pointer 55 is preferably of the type adapted to be moved with the band changing switch 18 to indicate the band to which the apparatus is tuned. For this purpose the band shaft 20 carries a toothed gear 57 which meshes with rack 59 on a slotted plate 61 which is slidably fixed to the front of the chassis 10 as by studs 63. The pointer 55 is carried by plate 61 and is guided and fixed against lateral displacement by a grooved wheel 65. Movement of a knob (not shown) on shaft 20 positions the pointer 55 so that its apex is adjacent the frequency scale corresponding to the frequency band to which the set is adjusted.

The dial moving mechanism may be of any suitable or convenient type. It may, for example, be constituted by a gear reduction device similar to that described in U. S. P. 2,076,625 to Donald R. De Tar issued April 13, 1937, and connected between an actuating shaft 70 and the main tuning shaft 14. As shown in Fig. 2, such device includes a pair of complementary rotor elements in the form of balls 72, 74 supported in a U-shaped retaining member 76 which is fixed by one of its arms 76a to the back mounting plate 22. Member 76 is provided in the U with circular holes in which the balls 72, 74 have a free running fit. These balls fit snugly against the inner side walls of a spool 78 which is fixed for rotation on shaft 70.

In applying the De Tar device to the set, the edge of a disc 80 on the main tuning shaft 14 is inserted between the balls 72, 74. The distance of the spool ends is slightly less than twice the diameter of one of the balls plus the thickness of the disc 80 so that upon insertion of the edge of disc between the balls 72—74 the spool ends are flexed slightly outwardly. With the parts assembled, therefore, the balls are held in frictional driving engagement with the opposite faces of the disc 80 and the frictional driving surfaces of the spool ends by the spring action of the latter.

A desired band having been selected by rotation of wave change switch shaft 20 and with the pointer 55 in position adjacent the selected band scale on 40, inter-station tuning is accomplished by rotating shaft 70 by means of a knob (not shown) fixed thereon. Due to the frictional driving engagement between the inner faces of the spool 78 and the balls 72, 74 the latter are caused to rotate about fixed axes each perpendicular to the axis of rotation of the spool. The main tuning shaft 14 is then caused to rotate by reason of the frictional driving engagement between the balls and the respective opposite faces of the disc 80. As previously set forth, this disc 80 carries peripheral teeth which mesh with the teeth of the gear wheel 36 on hub 30 so that simultaneous movement of the main tuning shaft 14 and the dial hub 30 is effected.

As the dial moves, the luminous pattern on electrode 50 in the resonance indicating tube 46 changes as determined by the electrical condition of the circuits with which it is associated. Since the pattern of the resonance indicator and the dial and the frequency pointer 55 are all directly in the operator's line of sight, they necessarily mutually complement each other as aids to the tuning operation.

The combined frequency indicating dial and resonance indicator of Figs. 1 and 2 may be viewed through an escutcheon of any suitable design. The form of escutcheon shown in Fig. 4 exposes a portion only of the main dial 40 and the entire auxiliary dial 42 and its station indicia 42a so that in tuning from one station to another, the direction and relative location of station markings are at all times apparent. If desired, the escutcheon may conceal a portion of the auxiliary dial 42 and the upper half of the resonance indicator tube 46.

The invention is not limited in its application to tuning systems employing fixed pointers, rotatable dials, 360° frequency band scales, and stationary resonance indicating tubes.

Figs. 5 and 6 show the invention as applied to a radio receiver having a tuning mechanism employing a moving frequency-indicating pointer 85 and a normally stationary dial 87 having semi-circular frequency band scales 87a, 87b, 87c, thereon. Here the resonance indicator tube, indicated generally at 89 is fitted snugly as in a packing 91 of felt or the like in hub 93 for movement with the hub. The pointer 85 is likewise adapted to move with the hub 93 and for this purpose is fixed thereon at right angles to its axis of rotation.

The frequency band scales 87a, 87b, 87c are preferably arranged on dial 87 in the manner described in copending application Serial No. 36,901 to Sheldon C. Hayward, filed August 19, 1935, Patent Number 2,051,851. In this application the dial is described as having a plurality of band scales eccentrically arranged (with respect to each other) on the dial surface and symmetrically arranged in a group around a common axis of said surface. In the instant case, the axis of the dial surface 87 is offset a suitable distance from the axis of rotation of the hub 93. This insures accurate framing of the dial scales 87a, 87b, etc. in an arcuate aperture 97a in the dial escutcheon, when the dial is rotated in discrete steps by turning a knob on the wave change switch shaft 99. This movement is effected by means of a lever mechanism, 101, 103, which actuates a gear segment 105 which meshes with a complementary gear 107 on the annulus 109 to which dial 87 is fixed. The hub 93 moves independently of the dial 87.

The hub 93 and hence the resonance indicator tube 89 and the dial pointer 85 are rotated by means of a taut cord 111 connected between a pulley 113 on the hub 93 and pulley 115 on the main tuning shaft 117. The tuning shaft 117 is adapted to be moved by a knob (not shown) and a pulley 121 attached to shaft 123 and connected to another pulley 119 on tuning shaft 117 by a second cord 125.

As in the embodiment of Fig. 1, the resonance indicating tube is arranged in a known manner to be energized in accordance with the electrical condition of the receiver. The actual condition of resonance at the frequency indicated by the pointer is shown by the "spread" of the luminous pattern (or the dark portion thereof) about a central line common to both the pointer and the pattern. Since both pointer and tube are observable at a single glance, the operator is constrained throughout the tuning operation to observe both the frequency and resonance indications and to continually check one against the other instead of relying, in the ultimate adjustment, solely upon the resonance indication.

As a number of possible embodiments may be made of the above invention and as changes may be made in the embodiments set forth without departing from the spirit and scope of the invention, it is to be understood that the foregoing is to be interpreted as illustrative and not in a limiting sense, except as required by the appended claims and by the prior art.

What is claimed is:—

1. The combination with radio apparatus having a frequency indicating device including a scale bearing surface and a frequency indicating pointer relatively rotatable about an axis which is normal to the plane of said surface, of a resonance indicating discharge tube mounted along the said rotational axis with its resonance indicating surface surrounding said axis and arranged to be energized in accordance with the resonant condition of said apparatus at the indicated frequency.

2. The invention as set forth in claim 1 and wherein means are provided for rotating said scale bearing surface with respect to said pointer and about said resonance indicating discharge tube.

3. The invention as set forth in claim 1 and wherein means are provided for moving said pointer with respect to said scale bearing surface and about the axis along which said resonance indicating discharge tube is mounted.

4. The invention as set forth in claim 1 wherein said resonance indicating discharge tube is provided with an electrode having a surface which is rendered fluorescent over an area thereof determined by the resonant condition of said apparatus, and wherein said pointer forms a continuation of a line bisecting said fluorescent area.

5. In a radio receiver, a hollow hub, a dial arranged about said hub normal to the axis thereof, a resonance indicating member constituted by a discharge tube mounted in said hub and having an electrode surface substantially parallel to the surface of said dial, said electrode surface having an area which is rendered fluorescent as determined by the resonant condition of said receiver, a frequency indicating pointer arranged to cooperate with said dial, said pointer forming a continuation of a line bisecting the fluorescent area of said electrode, and means for relatively moving said dial and pointer whereby to secure an "in-line" indication of the resonant condition of said apparatus at the frequency indicated by said pointer.

6. The invention as set forth in claim 5 and wherein said dial is fixed against rotation and said hub, said resonance indicating discharge tube and said frequency indicating member move with respect to said dial.

7. The invention as set forth in claim 5 and wherein said frequency indicating member and said resonance indicating discharge tube are fixed against rotation and said hub and dial move with respect thereto.

8. The invention as set forth in claim 5 wherein an auxiliary dial is provided, said auxiliary dial being in the form of a bezel removably fitted in said hub about said discharge tube and having a dial surface extending in a plane parallel to said first mentioned dial surface.

JAMES E. ALBRIGHT.
WENDELL L. CARLSON.